(12) United States Patent
Kim

(10) Patent No.: US 10,229,609 B2
(45) Date of Patent: Mar. 12, 2019

(54) METHOD, SYSTEM AND RECORDING MEDIUM FOR PROVIDING CONTENT TO BE LEARNED

(71) Applicant: NAVER Corporation, Seongnam-si (KR)

(72) Inventor: Ryan Kim, Seongnam-si (KR)

(73) Assignee: NAVER Corporation, Seongnam-si (KR)

( * ) Notice: Subject to any disclaimer, the term of this patent is extended or adjusted under 35 U.S.C. 154(b) by 474 days.

(21) Appl. No.: 14/943,927

(22) Filed: Nov. 17, 2015

(65) Prior Publication Data

US 2016/0170612 A1 Jun. 16, 2016

(30) Foreign Application Priority Data

Dec. 12, 2014 (KR) .......................... 10-2014-0179526

(51) Int. Cl.
| | |
|---|---|
| *G09B 17/00* | (2006.01) |
| *G09B 5/06* | (2006.01) |
| *G09B 19/06* | (2006.01) |
| *G09B 5/02* | (2006.01) |

(52) U.S. Cl.
CPC ............... *G09B 17/00* (2013.01); *G09B 5/02* (2013.01); *G09B 5/06* (2013.01); *G09B 19/06* (2013.01)

(58) Field of Classification Search
CPC ..................................................... G09B 17/00
USPC ........................................................ 434/157
See application file for complete search history.

(56) References Cited

U.S. PATENT DOCUMENTS

| | | | | |
|---|---|---|---|---|
| 6,269,371 | B1* | 7/2001 | Ohnishi | ................ G06F 9/4406 |
| 2004/0102956 | A1 | 5/2004 | Levin | |
| 2007/0269775 | A1* | 11/2007 | Andreev | .................. G09B 7/00 |
| | | | | 434/156 |
| 2008/0244040 | A1* | 10/2008 | Bhatia | ..................... H04L 47/14 |
| | | | | 709/219 |
| 2010/0161733 | A1 | 6/2010 | Bower et al. | |

FOREIGN PATENT DOCUMENTS

| | | |
|---|---|---|
| CN | 1525354 A | 9/2004 |
| CN | 103455160 A | 12/2013 |
| JP | 2007-334797 | 12/2007 |
| JP | 2011-516905 | 5/2011 |
| KR | 10-1999-0034308 | 5/1999 |
| TW | 200921423 | 5/2009 |
| TW | M399365 | 3/2011 |

(Continued)

OTHER PUBLICATIONS

Taiwan Office Action dated Aug. 25, 2016 by the Taiwan Patent Office corresponding to Taiwan patent application No. 104140864.

(Continued)

*Primary Examiner* — Thomas Hong
(74) *Attorney, Agent, or Firm* — Greer Burns & Crain Ltd.

(57) ABSTRACT

Provided is a method, system, and/or non-transitory computer readable medium for providing learning content using a wordbook. A content providing method may include selecting a target word to be learned from a wordbook list, determining a content type of the target word based on a network state, and providing content associated with the target word using a push notification of the content type.

16 Claims, 14 Drawing Sheets

(56) References Cited

FOREIGN PATENT DOCUMENTS

TW                M399365 U        3/2011

OTHER PUBLICATIONS

Japanese Office Action dated Oct. 11, 2016 by the Japanese Patent Office corresponding to Japanese patent application No. 2015-200737.
Chinese Office Action dated Jan. 9, 2018 by the Chinese Patent Office corresponding to Chinese patent application No. 201510628465.6.

* cited by examiner

METHOD, SYSTEM AND RECORDING MEDIUM FOR PROVIDING CONTENT TO BE LEARNED

CROSS-REFERENCE TO RELATED APPLICATION

This application claims priority from and the benefit of Korean Patent Application No. 10-2014-0179526, filed on Dec. 12, 2014 in the Korean Intellectual Property Office (KIPO), the disclosure of which is incorporated herein in its entirety by reference.

BACKGROUND

1. Field

Various exemplary embodiments of the present invention relate to technologies for providing content to be learned using a wordbook.

2. Description of the Background

A mobile communication terminal released in the early stage of the technology generally had only the simple functions of a mobile telephone. On the other hand, a current mobile communication terminal has various multimedia functions, such as that of an MP3 player, wireless Internet access, etc., beyond merely the simple calling functions.

Further, many additional functions, for example, mobile games, wireless Internet, etc., that are capable of using the multimedia functions of the mobile communication terminal are also in service in current devices.

Many current mobile communication terminals are performing wireless Internet service using a wireless Internet browser, such as, for example, a wireless application protocol (WAP) browser, etc. Also, the current mobile communication terminals may search for a variety of information using a wireless Internet platform, for example, a general virtual machine (GVM), a binary runtime environment for wireless (BREW), JAVA, etc., without restrictions on time and occasion.

SUMMARY

Some exemplary embodiments of the present invention provide a method, system, and/or non-transitory computer readable medium that provides content to be learned using a wordbook.

Some exemplary embodiments of the invention also provide a method, system, and/or non-transitory computer readable medium that differentially provides content to be learned based on a network state.

According to at least one exemplary embodiment, there is provided a content providing method executed on at least one computer, the method including selecting a target word to be learned from a wordbook list, determining a content type of the target word based on a network state, and providing content associated with the target word using a push notification of the content type.

Selecting the target word to be learned may include selecting the target word from the wordbook list based on a word selection rule by applying, as the word selection rule, at least one of: selecting a word having an example, selecting a word that needs to be memorized, selecting based on a wordbook registration order (such as the order that the words were registered into the wordbook list), selecting based on the number of words used for the example of the word, and selecting based on a difficulty level.

Selecting the target word to be learned may include updating the target word in response to a presence of matters to be modified in the wordbook list or at desired intervals. The presence of matters to be modified represents the presence of change of state of the wordbook, e.g., the occurrence of the modification such as a case in which the user registers a new word, a case in which a memorized word or a word that needs to be memorized is modified, or a case in which basic dictionary information stored in the wordbook is updated.

Determining of the content type may include: (a) in an offline state, determining the content type based on a presence of the content and whether the content has been downloaded, and (b) in an online state, determining the content type based on the presence of the content regardless of whether the content has been downloaded or not.

Determining of the content type may include: (a) in an offline state, determining the content type based on a presence of an example of the target word to be learned and a translation of the example and whether the example and the translation have been downloaded, and (b) in an online state, determining the content type based on the presence of the example and the translation, regardless of whether the example and the translation have been downloaded.

Item (a) from above may include determining whether a word having an example and a translation and of which the example and the translation have been downloaded, among target words to be learned, as either a first type that provides a headword and a meaning of the word or as a second type that provides the example and the translation. A headword of a word indicates spellings of the word.

Item (a) may further include excluding, from the target words to be learned, a word having no example, a word having an example and no translation, and a word having an example and a translation and of which the example and the translation have not been downloaded.

Item (a) may include determining a word having an example and a translation and of which the example and the translation have not been downloaded, among the target words to be learned, as either a first type that provides a headword and a meaning of the word, and determining a word having an example and a translation and of which the example and the translation have been downloaded, among the target words to be learned, or as a second type that provides the example and the translation.

Item (b) from above may include determining a word having an example and a translation among target words to be learned as either a first type that provides a headword and a meaning of the word or as a second type that provides the example and the translation, and determining a word having an example and no translation among the target words to be learned as a third type that provides an opportunity to participate in translating the example.

Item (b) may further include excluding a word having no example from the target words to be learned.

The first type and the second type may be determined based on a preset ratio. The type of push notification of the learning content is selected between the first type and the second type, and the push notification of the selected type is provided. In this case, the ratio of selection between the first type and the second type is predetermined, e.g., first type: second type=1:2, first type:second type=2:1, etc., and the type of the push notification is determined based on the predetermined ratio.

The second type may process the target word to be learned included in the example to be blank. The blank indicates that the space is able to be filled with the word. When the example sentence related to or including the target word to be learned is displayed, the target word is not displayed within the example sentence. The space with which the target word is to be filled is displayed as a blank. Here, it is possible to provide a learning method of providing the target word to be learned as the blank within the sentence (or phrase), without displaying the target word, so that a user may recall or directly input a corresponding word.

The content type may be classified into either a first type that provides a headword and a meaning of the target word to be learned, a second type that provides an example of the target word and a translation of the example, or a third type that provides an opportunity to participate in translating the example of the target word. Providing of the content may include providing the opportunity to be directed to a study course for learning each individual word of the wordbook list through a push notification of the first type and the second type, and providing the opportunity to be directed to a translation participation page to participate in translating the example through a notification of the third type.

According to at least one exemplary embodiment, there is provided a non-transitory computer readable recording medium storing computer readable instructions to control a computer system to provide content to be learned, wherein the computer readable instructions control the computer system by a method including selecting a target word to be learned from a wordbook list, determining a content type of the target word based on a network state, and providing content associated with the target word using a push notification of the content type.

According to at least one exemplary embodiment, there is provided a content providing system including a selector configured to select a target word to be learned from a wordbook list, a determiner configured to determine a content type of the target word based on a network state, and a provider configured to provide content associated with the target word using a push notification of the content type.

The selector may be configured to select the target word to be learned from the wordbook list based on a word selection rule by applying, as the word selection rule, at least one of: selecting a word having an example, selecting a word that needs to be memorized, selecting based on wordbook registration order, selecting based on the number of words used for the example of the word, and selecting based on a difficulty level.

The determiner may be further configured to, in an offline state, determine the content type based on a presence of the content and whether the content has been downloaded, and in an online state, determine the content type based on the presence of the content regardless of whether the content has been downloaded or not.

In the offline state, the determiner may be further configured to determine a word having an example and a translation and of which the example and the translation have been downloaded, among target words to be learned, as a first type that provides a headword and a meaning of the word or a second type that provides the example and the translation, and to exclude, from the target words, a word having no example, a word having an example and no translation, and a word having an example and a translation and of which the example and the translation have not been downloaded.

In the online state, the determiner may be further configured to determine a word having an example and a translation, among target words to be learned, as a first type that provides a headword and a meaning of the word or a second type that provides the example and the translation, to determine a word having an example and no translation among the target words to be learned as a third type that provides an opportunity to participate in translating the example, and to exclude a word having no example from the target words.

The content type may be classified into a first type that provides a headword and a meaning of the target word to be learned, a second type that provides an example of the target word and a translation of the example, and a third type that provides an opportunity to participate in translating the example of the target word, and the provider may be further configured to provide an opportunity to be directed to o a study course for learning each individual word of the wordbook list through a push notification of the first type and the second type, and to provide an opportunity to be directed to a translation participation page to participate in translating the example through a push notification of the third type.

It is to be understood that both the foregoing general description and the following detailed description are explanatory and are intended to provide further explanation of the exemplary embodiments as claimed.

EFFECT

According to at least one exemplary embodiment, since a push notification for wordbook learning is provided, a user may immediately verify learning content and perform learning through the push notification without connecting to a wordbook. Accordingly, it is possible to improve the user's convenience and learning efficiency.

Also, according to at least one exemplary embodiment, it is possible to support further various and high-dimensional learning environments by differentially providing learning content based on dictionary information downloaded to a terminal in either an offline state or an online state of a network.

BRIEF DESCRIPTION OF THE DRAWINGS

The foregoing and other features of the exemplary embodiments will be apparent from the more particular description of non-limiting exemplary embodiments, as illustrated in the accompanying drawings in which like reference characters refer to like parts throughout the different views. The drawings are not necessarily to scale, emphasis instead being placed upon illustrating principles of inventive concepts. In the drawings.

DETAILED DESCRIPTION

Figure 1:
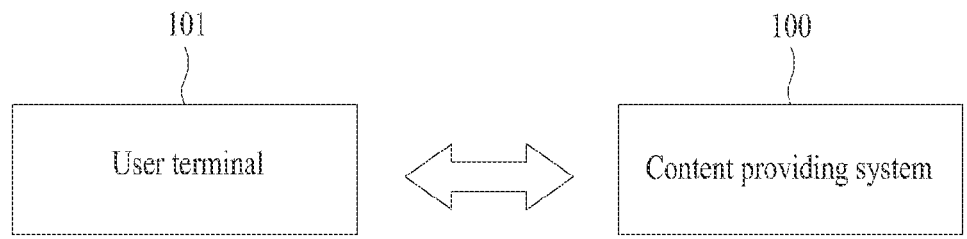
FIG. 1 is a diagram illustrating a relationship between a user terminal and a content providing system according to at least one exemplary embodiment.

Various exemplary embodiments will now be described more fully with reference to the accompanying drawings, in which some exemplary embodiments are shown. Exemplary embodiments, may, however, be embodied in many different forms and should not be construed as being limited to the embodiments set forth herein. Rather, these exemplary embodiments are provided so that this disclosure will be thorough and complete, and will fully convey the scope of the exemplary embodiments to those of ordinary skill in the art. In the drawings, the thicknesses of layers and regions are exaggerated for clarity. Like reference characters and/or numerals in the drawings denote like elements, and thus their description may be omitted.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements or layers should be interpreted in a like fashion (e.g., "between" versus "directly between," "adjacent" versus "directly adjacent," "on" versus "directly on"). As used herein the term "and/or" includes any and all combinations of one or more of the associated listed items.

It will be understood that, although the terms "first," "second," etc. may be used herein to describe various elements, components, regions, layers and/or sections. These elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of exemplary embodiments.

The terminology used herein is for the purpose of describing particular embodiments only and is not intended to be limiting of exemplary embodiments. As used herein, the singular forms "a," "an" and "the" are intended to include the plural forms as well, unless the context clearly indicates otherwise. It will be further understood that the terms "comprises," "comprising," "includes" and/or "including," if used herein, specify the presence of stated features, integers, steps, operations, elements and/or components, but do not preclude the presence or addition of one or more other features, integers, steps, operations, elements, components and/or groups thereof. Expressions such as "at least one of," when preceding a list of elements, modify the entire list of elements and do not modify the individual elements of the list.

Unless otherwise defined, all terms (including technical and scientific terms) used herein have the same meaning as commonly understood by one of ordinary skill in the art to which the exemplary embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein Hereinafter, various exemplary embodiments will be described with reference to the accompanying drawings.

At least one exemplary embodiment relates to technologies for providing a wordbook service, and more particularly, to a method, system, and/or non-transitory computer readable medium that provides content for wordbook learning.

A wordbook service used herein is provided for the purpose of word learning and the like and may indicate a service capable of storing words, idioms, and examples on the dictionary, and allowing a user to read, edit, and print the same.

FIG. 1 is a diagram illustrating a relationship between a user terminal and a content providing system according to some exemplary embodiments. FIG. 1 illustrates a content providing system 100 and a user terminal 101. In FIG. 1, an indicator with arrowheads indicates that data may be transmitted and received between the content providing system 100 and the user terminal 101. While only a single user terminal 101 is illustrated in FIG. 1, the exemplary embodiments are not limited thereto and more than one user terminal may connect to/communicate with the content providing system 100.

The user terminal 101 may refer to any type of terminal device, for example, a personal computer (PC), a laptop, a smartphone, a tablet, a smart device, a wearable computer, a personal digital assistant (PDA), etc., capable of connecting to a website/mobile site associated with the content providing system 100 or installing and executing a service exclusive application (hereinafter, a "wordbook app"). Here, the user terminal 101 may perform the overall service operation, such as a service screen configuration, data input, data transmission and reception, data storage, or the like, under the control of the website/mobile site or the wordbook app.

The content providing system 100 serves as a service platform that provides a wordbook service to a client. Here, the content providing system 100 may be configured in application form on the user terminal 101 and without being limited thereto, may be configured to be included in a service platform that provides a wordbook service in a client-server environment. In particular, the content providing system 100 provides a push notification and content to be learned for wordbook learning.

The wordbook app according to some exemplary embodiments may include a basic function of providing a stored wordbook list and a function of providing a push notification and learning content for learning using the wordbook list. The wordbook app may be configured in an independently operating program form or an in-app form of a specific application, for example, a dictionary app, to be operable on the specific application.

Hereinafter, although a service environment using the wordbook app is described, it is only an example. Thus, a wordbook service according to some exemplary embodiments may be configured as a connection environment of a website/mobile site.

Figure 2:
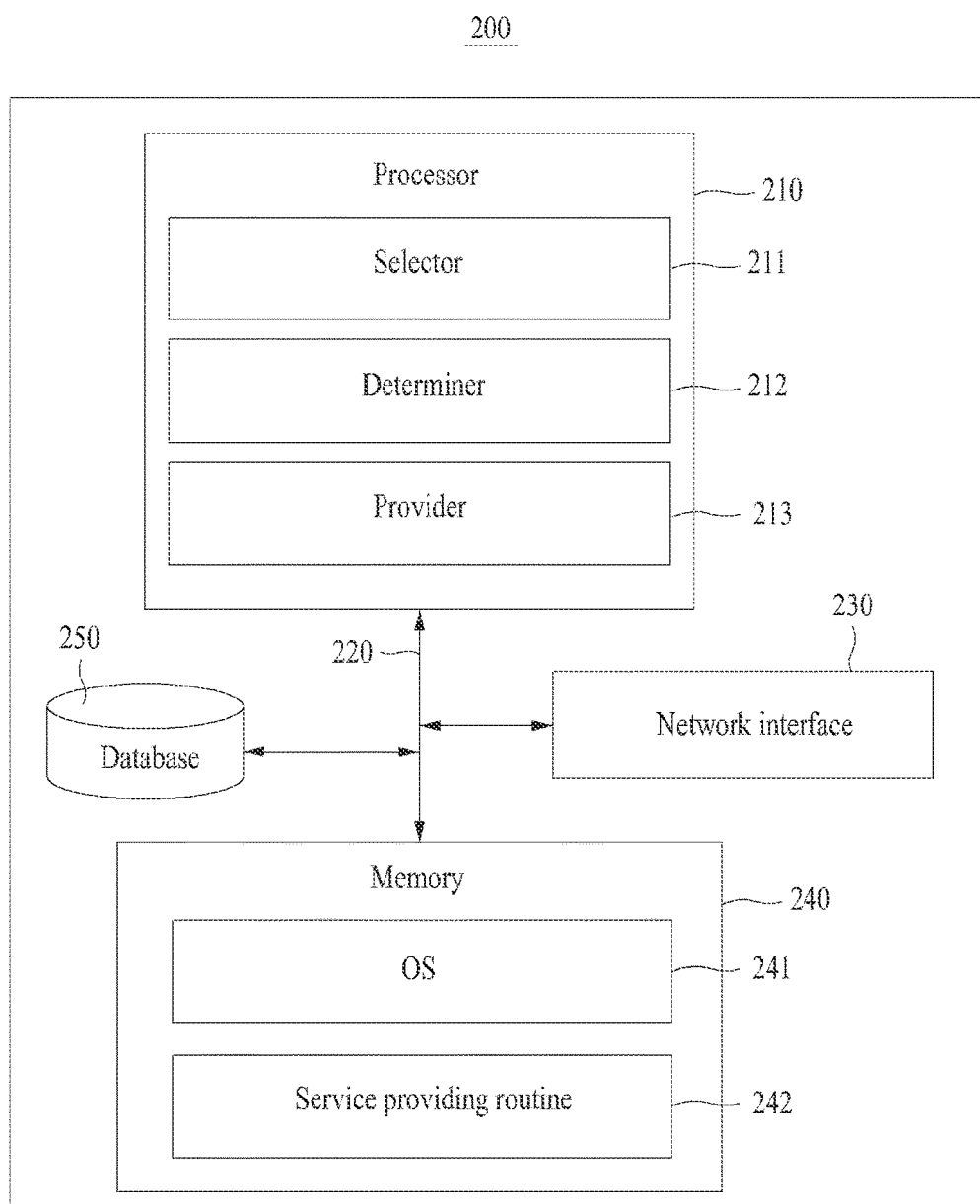
FIG. 2 is a block diagram illustrating a configuration of a content providing system for wordbook learning according to at least one exemplary embodiment.
Figure 3:
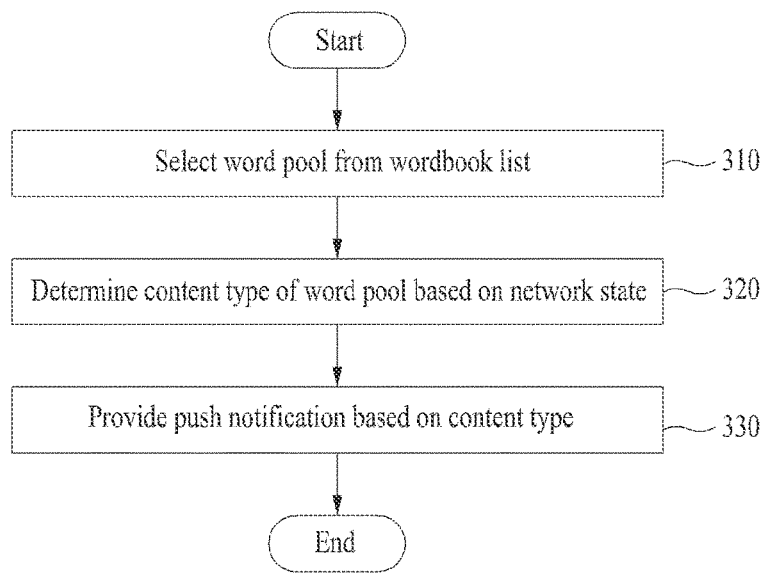
FIG. 3 is a flowchart illustrating a content providing method for wordbook learning according to at least one exemplary embodiment.

FIG. 2 is a block diagram illustrating a configuration of a content providing system according to some exemplary embodiments, and FIG. 3 is a flowchart illustrating a content providing method according to some exemplary embodiments.

Referring to FIG. 2, the content providing system 200 may include one or more computing devices, such as a server, that include at least one processor 210, a bus 220, a network interface 230, a memory 240, and a database 250. The memory 240 may include an operating system (OS) 241 and a service providing routine 242. The processor 210 may include computer readable instructions for specially programming the processor 210 as a selector 211, a determiner 212, and a provider 213. According to other exemplary embodiments, the content providing system 200 may include a greater or lesser number of constituent elements than the number of constituent elements shown in FIG. 2. For example, the content providing system 200 may include other constituent elements such as a display, a transceiver, etc. The selector 211, the determiner 212, and the provider 213 may be the hardware device(s) configured to perform processes or functions related to the embodiments of the present invention, which are executed by the processor.

The memory 240 may include a permanent mass storage device, such as a random access memory (RAM), a read only memory (ROM), a disc drive, a solid state drive, an optical drive, etc., as a computer readable storage medium. Also, program codes, for example, computer readable instructions, for the OS 241 and the service providing routine 242, and the like, may be stored in the memory 240. Such software constituent elements may be loaded from another computer readable storage medium separate from the memory 240 using a drive mechanism (not shown). The other computer readable storage medium may include, for example, a floppy drive, a disc, a tape, a DVD/CD-ROM drive, and a memory card. Software constituent elements may be loaded to the memory 240 through the network interface 230 instead of, or in addition to, the computer readable storage medium.

The bus 220 enables communication and data transmission between the constituent elements of the content providing system 200. The bus 220 may be configured using a high-speed serial bus, a parallel bus, a storage area network (SAN), and/or another appropriate communication technology.

The network interface 230 may be a computer hardware constituent element for connecting the content providing system 200 to the computer network. The network interface 230 may connect the content providing system 200 to the computer network through a wireless and/or wired connection.

The database 250 is configured by a wordbook app and serves to download basic dictionary information from an online dictionary database system, and to store and maintain the downloaded basic dictionary information as a wordbook list. For example, the database 250 may be used to provide a wordbook function in an offline local environment. Here, basic dictionary information relates to words found by the user from the dictionary, and may include spellings (headwords), phonetic symbols, sound data of a pronunciation, at least a portion of the meanings, and at least a portion of the examples and translations of the examples, for each word. For example, at least a portion of the meanings may be limited to a primary meaning within 20 letters among a plurality of meanings of a word defined in the dictionary. Also, at least a portion of examples may be limited to one representative example among a plurality of examples registered in the dictionary in association with the word. Each word may include information regarding whether an example and a translation of the example are present. That is, words in the dictionary may be classified into a word having no example, a word having an example and no translation, and a word having an example and a translation. The basic dictionary information may be collectively downloaded from the dictionary database system. A portion of the dictionary information, for example, an example and a translation, may be downloaded at a desired or alternatively predetermined point in time, for example, at a point in time at which the user connects to a wordbook list. Each word may include difficulty level information classified on the dictionary, for example, advanced (difficult)/intermediate/elementary (easy). Also, the database 250 may store a wordbook list by classifying words into a memorized word or a word that needs to be memorized based on a user setting.

Here, the content providing system 200 may support a cloud-based wordbook service by synchronizing the database 250. That is, in an example in which the user has logged into a user account and set a synchronization in an online state, words included in a wordbook list may be synchronized to the database 250 through matching with user information of the database 250. Thus, words found and stored by the user from another device or a PC may also be maintained using the same list pool. Accordingly, the content providing system 200 may provide a wordbook learning service by maintaining the same word list pool in any device using the synchronized wordbook list of the database 250.

The processor 210 may be configured to process computer readable instructions of a computer program by performing a basic arithmetic operation, a logic operation, and an input/output operation of the content providing system 200. The computer readable instructions may be provided from the memory 240 or the network interface 230 to the processor 210 through the bus 220. The processor 210 may be configured to execute program codes for the selector 211, the determiner 212, and the provider 213. The program codes may be stored in a storage device such as the memory 240.

When executed by a processor, such as the processor 210, the computer readable instructions associated with the selector 211, the determiner 212, and the provider 213 may specially configure the processor to perform operations 310 through 330 of FIG. 3.

Referring to FIG. 3, in operation 310, the selector 211 selects a word pool from a wordbook list to provide a push notification and learning. As an example of a selection criterion, the selector 211 may select at least a portion of the words having examples from a wordbook list stored in the database 250. As another example, the selector 211 may select at least a portion of the words that need to be memorized from a wordbook list stored in the database 250. As another example, the selector 211 may select a word pool based on a registration order, for example, the order in which words are relatively recently registered to the wordbook list. As another example, the selector 211 may select a word pool from a wordbook list stored in the database 250, based on a difficulty level. For example, the selector 211 may select a word corresponding to a difficulty level requested by the user from the wordbook list as a word corresponding to a push notification and a target to be learned. As another example, the selector 211 may select a word pool from a wordbook list stored in the database 250, based on the number of words used for an example for a word having the example. For example, the selector 211 may select a word having an example that includes at least a desired or alternatively predetermined number of words from the wordbook list as a word corresponding to a push notification and a target to be learned. As another example, the selector 211 may select a word pool by combining, as word selection priority, two or more of the aforementioned selection criteria, for example, a presence/absence of an example, recentness of registration, whether a word needs to be memorized, the number of words used for an example, and a difficulty level. For example, with respect to the entire group of words having examples, the selector 211 may select a word that needs to be memorized or a recent word from among the words having the examples, or may select a recent word that needs to be memorized from among the words having the examples. Additionally, with respect to words to be memorized, the selector 211 may select a word pool by classifying the words to be memorized into a recent word of an advanced level, a recent word of an intermediate level, and a recent word of an elementary level.

The selector 211 may update the word pool selected as the target word to be learned at a desired or alternatively predetermined point in time. For example, the selector 211 may update the word pool at time intervals of, for example, 1 day, 1 week, etc. As another example, the selector 211 may update the word pool at a point in time at which a modification occurs in the wordbook. For example, in response to the occurrence of the modification such as a case in which the user registers a new word, a case in which a memorized word or a word that needs to be memorized is modified, or a case in which basic dictionary information is updated, the selector 211 may update the word pool.

In operation 320, the determiner 212 may determine a content type of the word pool based on a network state. Contents for wordbook learning may be classified into: (1) a first type that provides a word and a meaning of the word, (2) a second type that provides an example of a word, and (3) a third type that provides an opportunity to participate in translating an example of a word. The first type preferably indicates spellings, phonetic symbols, and at least some meaning of a word. The second type preferably enables the user to recall or directly input a word by providing an example of the word, however, processing the word as a blank. The third type preferably enables the user to participate in translating an example by providing the user with the example including the word. Here, when a network of a user terminal is in an offline state, the determiner 212 may determine the content type based on whether the example is present and whether the example is downloaded. For example, in an offline environment, the determiner 212 may determine words having examples and translations and that have been downloaded as the first type and the second type. The determiner 212 may apply a push notification ratio, for example, first type:second type=1:2, first type:second type=2:1, etc., to the words having the examples and the translations and being downloaded. As another example, in an offline environment, the determiner 212 may determine words having examples and translations and that have not been downloaded as the first type, and may determine words having examples and translations and that have been downloaded as the second type. As another example, in an offline environment, the determiner 212 may exclude words having no example or no translation or that have not been downloaded from the push notification and the target to be learned. When the network is in an online state, the determiner 212 may determine the content type based on whether an example and a translation are present, regardless of whether the example and the translation have been downloaded. For example, in an online environment, the determiner 212 may determine words having examples and translations as the first type and the second type. Similarly, the determiner 212 may apply a push notification ratio between the first type and the second type to the words having the examples and the translations. As another example, in an online environment, the determiner 212 may determine words having examples and no translation as the third type that provides an opportunity to participate in translating an example. As another example, in an online environment, the determiner 212 may exclude words having no example from the push notification and the target to be learned.

In operation 330, the provider 213 may provide the push notification with respect to the selected word pool, based on the content type determined in operation 320. Here, the push notification may basically operate in the offline environment. When a portion of the dictionary information has not been downloaded to a terminal and the terminal is connectable to the network, the push notification may be performed by fetching data online. The push notification may be used to provide learning content based on a preset number of times and time zone. Here, push notification counts and time zone may be set to be default on a system or may be set by the user. The preset number of times indicates the number of times with which the push notifications are provided, and the time zone indicates the time period at which the push notifications are provided. That is, the push notifications are provided at the time zone with the number of times.

That is, the provider 213 may provide the wordbook learning by differentiating the learning content based on the network state and by pushing the learning content by the preset number of times within the preset time zone.

Further, the provider 213 may provide a learning path for each content type in response to a user request. For example, the provider 213 may provide a study course for memorizing individual words of the wordbook in the case of the first type and the second type, and may enable the user to be directed to a translation participation page that allows the user to participate in translating an example in the case of the third type.

In response to a request for an example of a word included in the wordbook list, the provider 213 may provide the example of the word based on the network state. Here, the provider 213 may provide, in a pop-up form, an example list page that includes the entire example list online in a network connection state. A sorting rule may be applied to the example list page so that the easiest and most basic example may be displayed at the top. For example, examples may be classified for each meaning of a word and may be sorted on the example list page. To this end, examples from the online dictionary may be utilized. Examples may be classified by matching a word and a meaning included in a translation (e.g., a meaning of a headword: go 가다 example search: going 가는 중이다). Further, an example of a basic word may be preferentially expanded and may be manually classified for each meaning. The basic word embraces a word online, a word stored in the wordbook etc., and the headword indicates spellings of the word. Examples may be sorted based on the difficulty level requested by the user and an acceptable length. The length indicates the number of words included in the example sentence.

For example, when the difficulty level is divided into advanced (2 stars), intermediate (1 star), elementary (0 stars), the priority based on the difficulty level and length may be sorted as follows:

1. (4 to 8 words) & {example including only words corresponding to 2 stars & (not including word corresponding to 1 star or 0 stars)}

2. (9 to 15 words) & {example including only words corresponding to 2 stars & (not including word corresponding to 1 star or 0 stars)}

3. (4 to 8 words) & {(2 stars or 1 star included) & word corresponding to 0 stars not included in example}

4. (9 to 15 words) & {(2 stars or 1 star included) & word corresponding to 0 stars not included in example}

5. (4 to 8 words) & {(2 stars or 1 star included) & word corresponding to 0 stars included in example}

6. (9 to 15 words) & {(2 stars or 1 star included) & word corresponding to 0 stars not included in example}

7. (3 or less words or over 15 words) & {example including only words corresponding to 2 stars & (not including word corresponding to 1 star or 0 stars)}

8. (3 or less words or over 15 words) & {(2 stars or 1 star included) & word corresponding to 0 stars not included in example}

9. (3 or less words or over 15 words) & {(2 stars or 1 star included) & word corresponding to 0 stars included in example}

Figure 4:
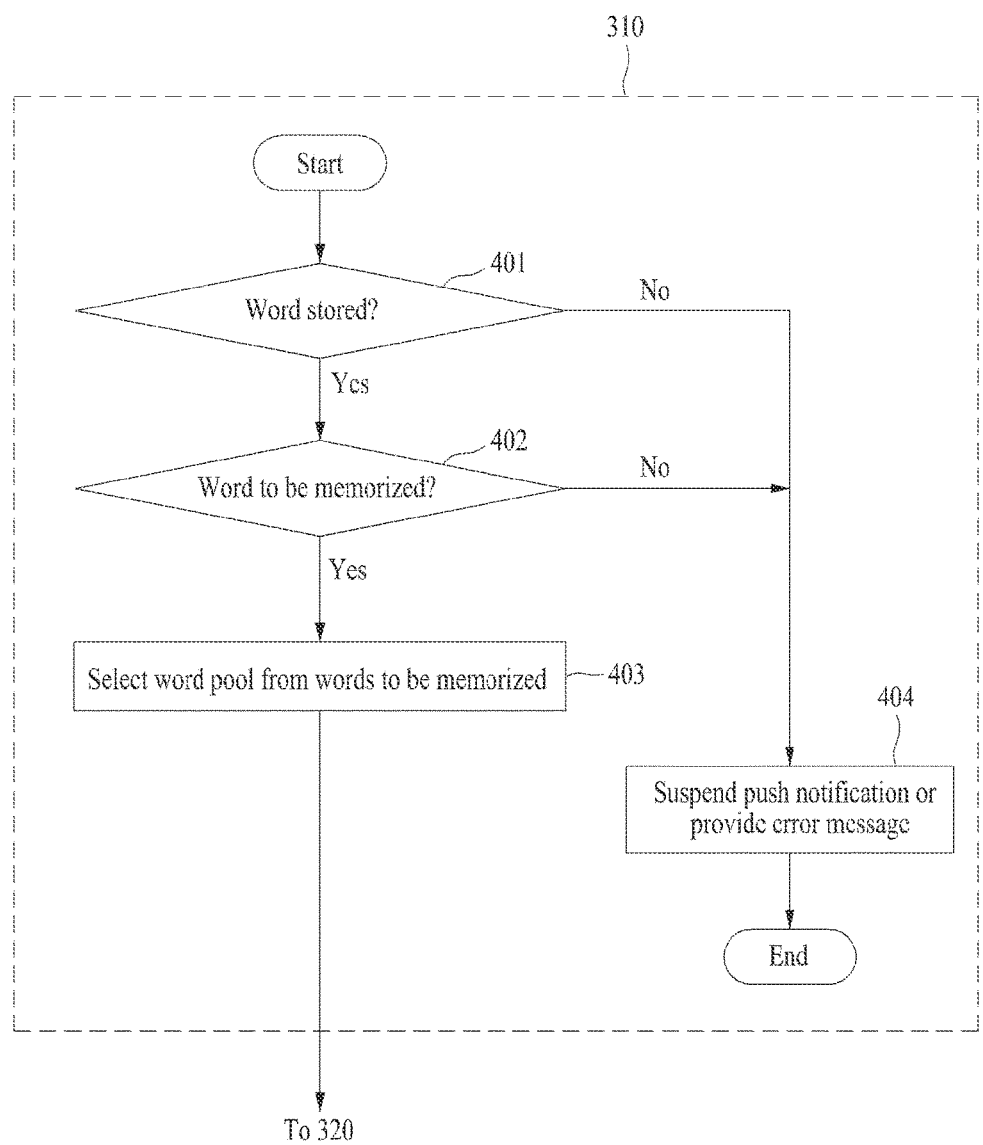
FIG. 4 is a flowchart illustrating an example of a process of selecting a word pool according to at least one exemplary embodiment.

FIG. 4 is a flowchart illustrating an example of a process of selecting a word pool according to some exemplary embodiments. Operations 401 through 404 of the word selecting process of FIG. 4 may be performed by the selector 211 of FIG. 2.

Storing, in a wordbook app, a word retrieved by a user on the dictionary and providing a push notification and learning with respect to a word having an example are assumed as a word selection priority herein.

In operations 401 and 402, whether one or more words are stored in a wordbook and whether at least one of the stored words still needs to be memorized are determined.

When one or more words are stored in the wordbook in operation 401 and when at least one of the stored words is to be memorized in operation 402, the selector 211 may select a word pool for the push notification from words that still need to be memorized in operation 403. Here, at least a portion of the words to be memorized that are stored in the wordbook, for example, a recent word based on a word registration order may be selected as a target word to be learned.

When no word is stored in the wordbook, or when one or more words are stored in the wordbook, however, a word to be memorized is absent, the selector 211 may suspend the push notification for wordbook learning or may provide an error message as the push notification in operation 404.

Figure 5:
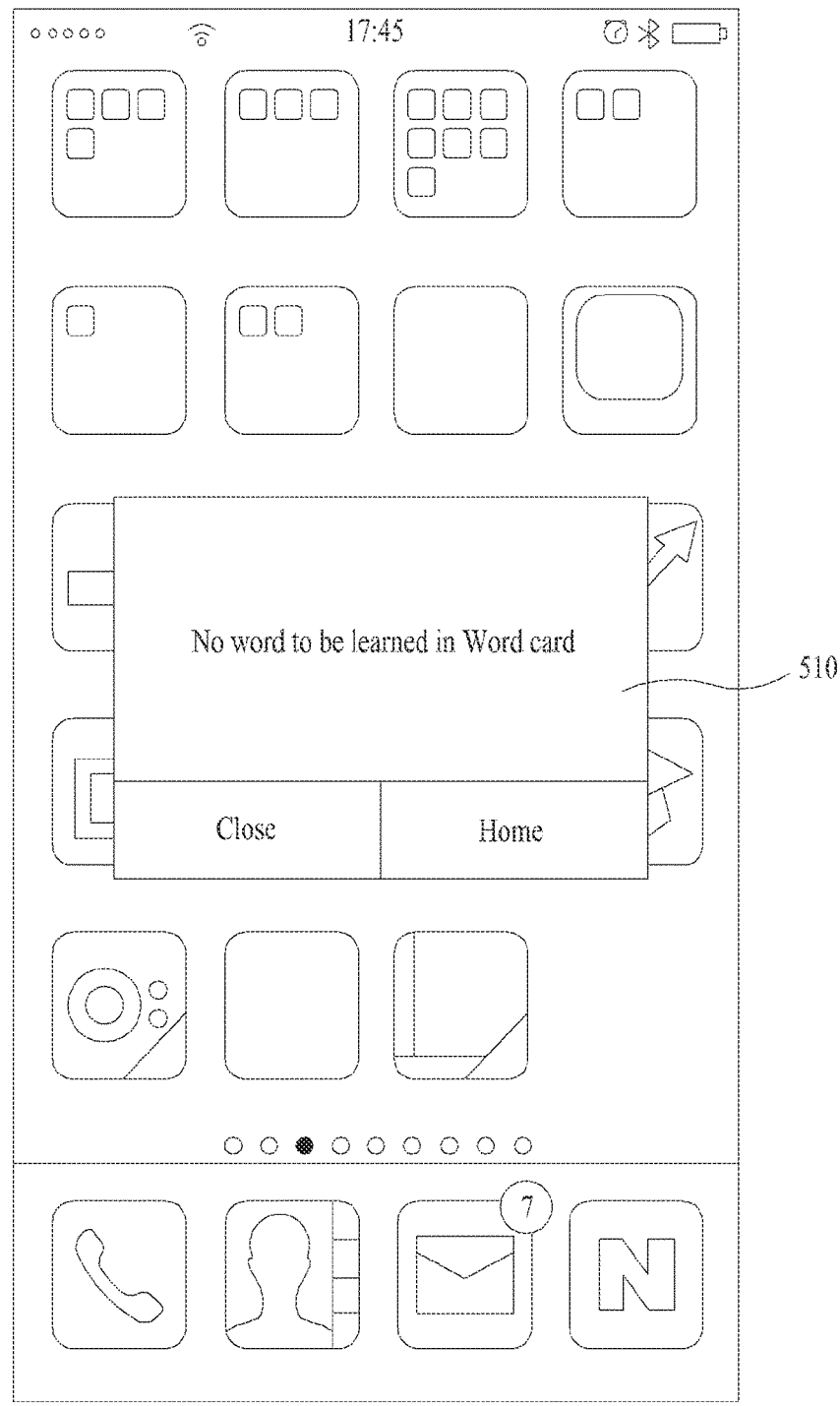
FIG. 5 illustrates an example of selecting a word pool according to at least one exemplary embodiment.

For example, referring to FIG. 5, when a word corresponding to a word selection criterion is absent during the word pool selecting process, the selector 211 may display a notification window 510 including an error message, for example, "no word to be learned in Word card," indicating a corresponding state. The notification window 510 may provide a path for moving to a home screen of a wordbook app together with the error message.

According to some exemplary embodiments, it is possible to select a meaningful word as a target to be learned from a wordbook list to provide a push notification and learning.

Figure 6:
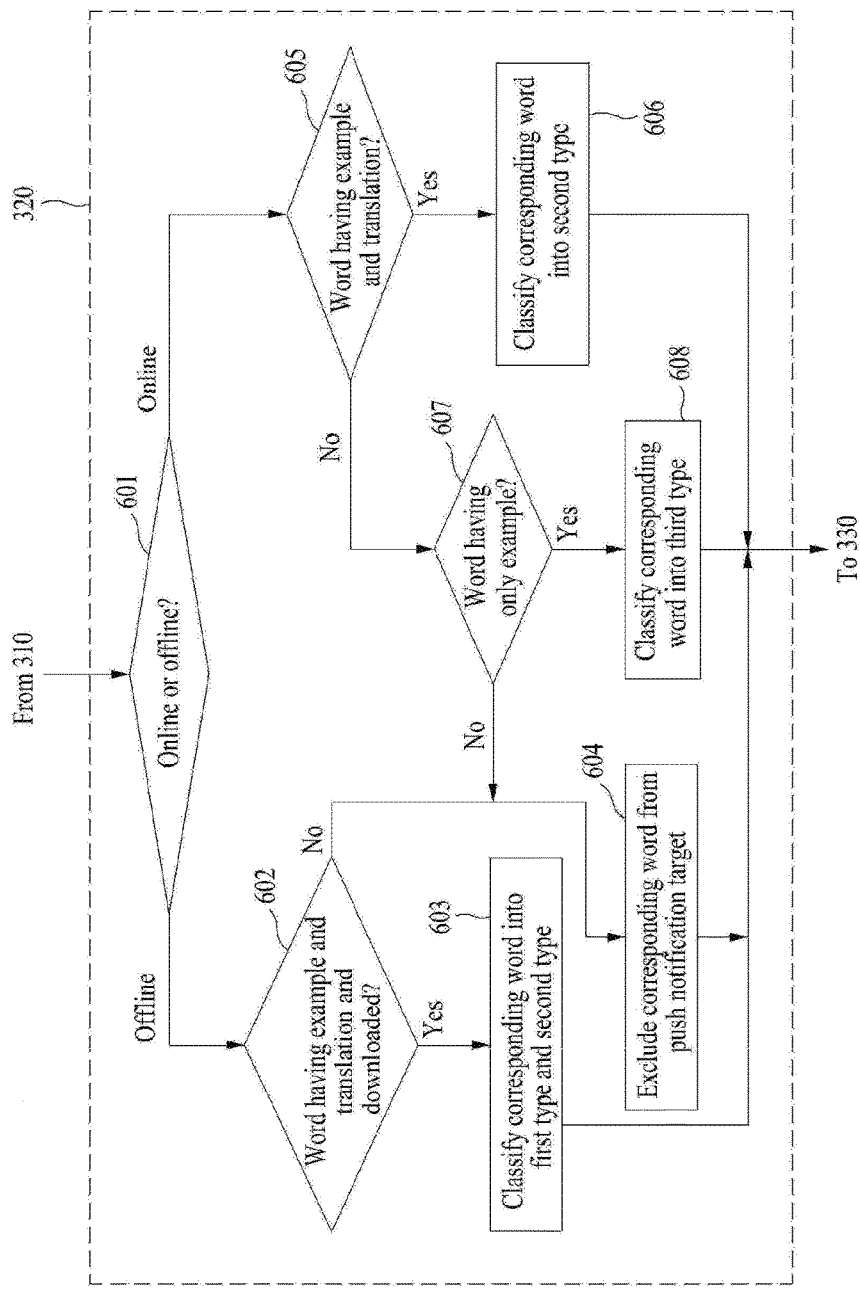
FIG. 6 is a flowchart illustrating an example of a process of determining a content type according to at least one exemplary embodiment.

FIG. 6 is a flowchart illustrating an example of a process of determining a content type according to some exemplary embodiments. Operations 601 through 608 of the content type determining process of FIG. 6 may be performed by the determiner 212 of FIG. 2.

When the word pool selection is completed, the determiner 212 may verify a network state of the user terminal in operation 601. Herein, learning content for the push notification may vary based on the network state.

First, a case in which the user terminal is in an offline state in which the network connection is impossible will be described.

The determiner 212 may classify a word having an example and a translation and that has been downloaded to the user terminal among words selected as a word pool into a first type and a second type in operations 602 and 603. Here, learning content may be provided based on a push notification ratio between the first type and the second type.

The determiner 212 may exclude, from the push notification target, a remaining word, for example, a word having no example, a word having an example and no translation, and a word having an example and a translation and that has not been downloaded in operations 602 and 604.

Next, a case in which the user terminal is in an online state in which the network connection is possible will be described.

The determiner 212 may classify a word having an example and a translation among the words selected as the word pool into the first type and the second type in operations 605 and 606. Similarly, content to be learned may be provided based on the push notification ratio applied between the first type and the second type.

The determiner 212 may classify a word having an example and no translation among the words selected as the word pool into a third type in operations 607 and 608. That is, the determiner 212 may classify, into the third type, a word having an example and no translation and thus, allowing a probability to participate in translating the example.

The determiner 212 may exclude a word having no example among the words selected as the word pool from the push notification target in operations 607 and 604.

In addition to the aforementioned rules, various expansion and modifications may be made. For example, in an offline environment, a word having an example and a translation, and that has not been downloaded may be classified into the first type, a word having an example and a translation and that has been downloaded may be classified into the second type, and a remaining word may be excluded from a push notification and target to be learned.

Figure 7:
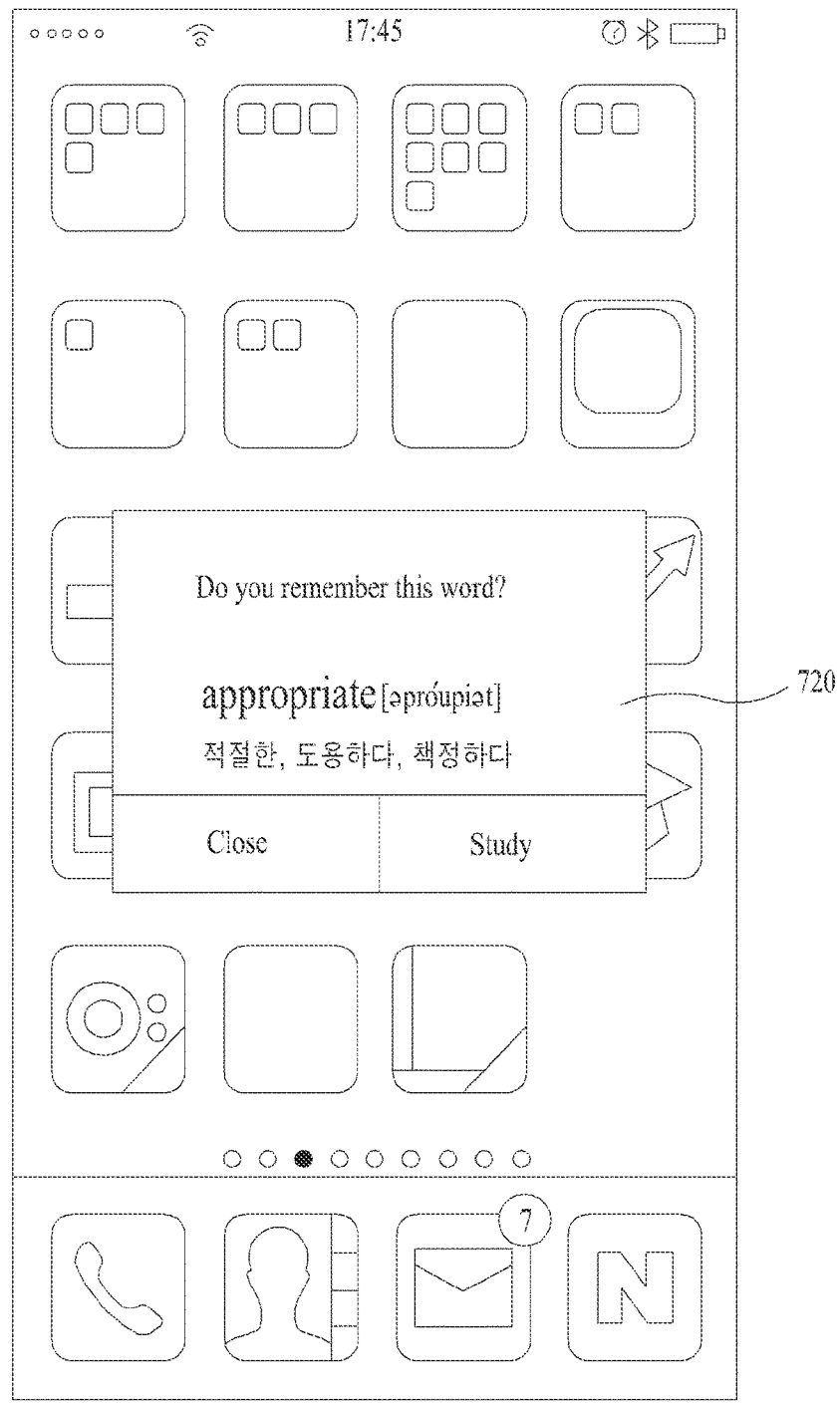
FIGS. 7 through 9 illustrate examples of a content type for wordbook learning according to at least one exemplary embodiment.
Figure 8:
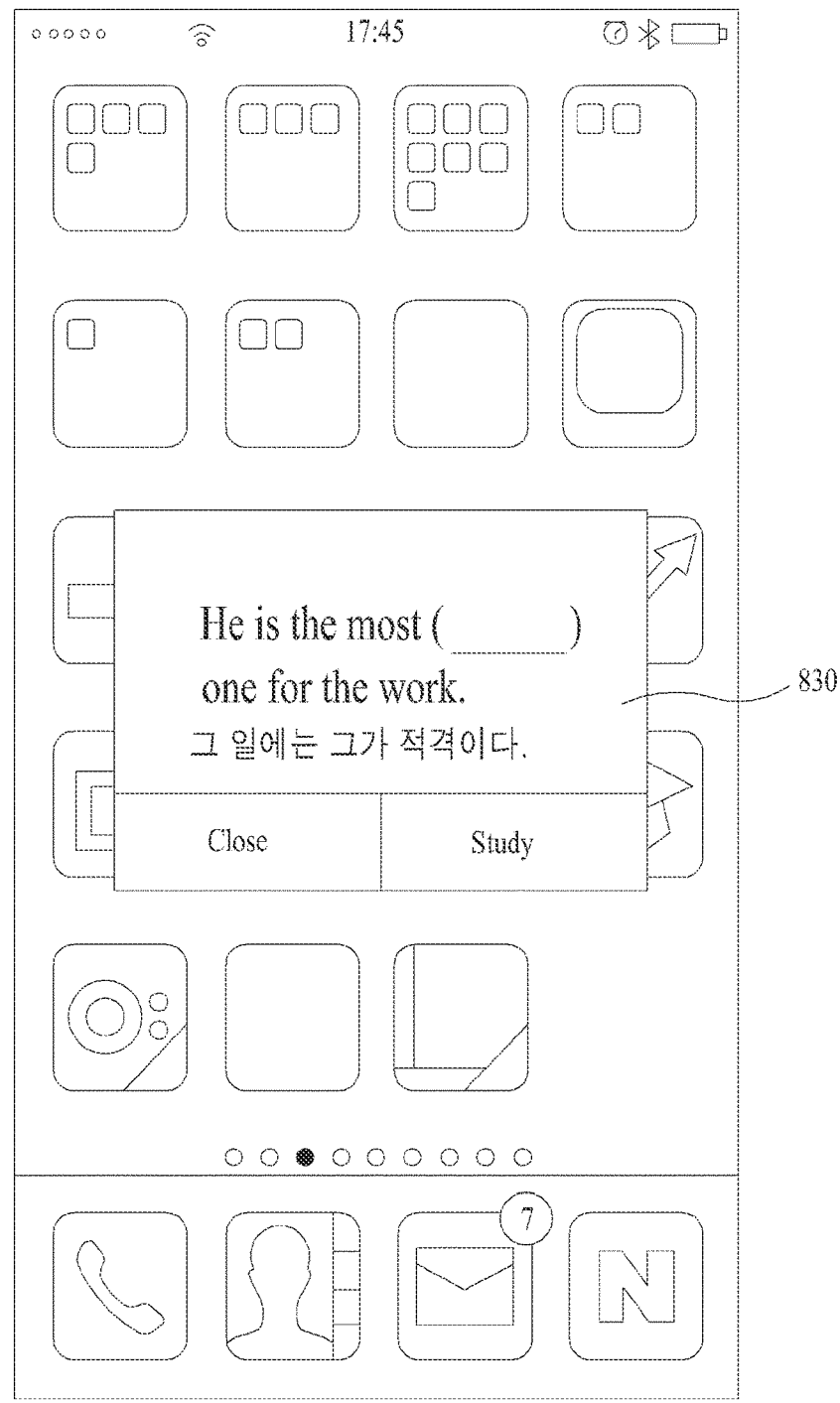
Figure 9:
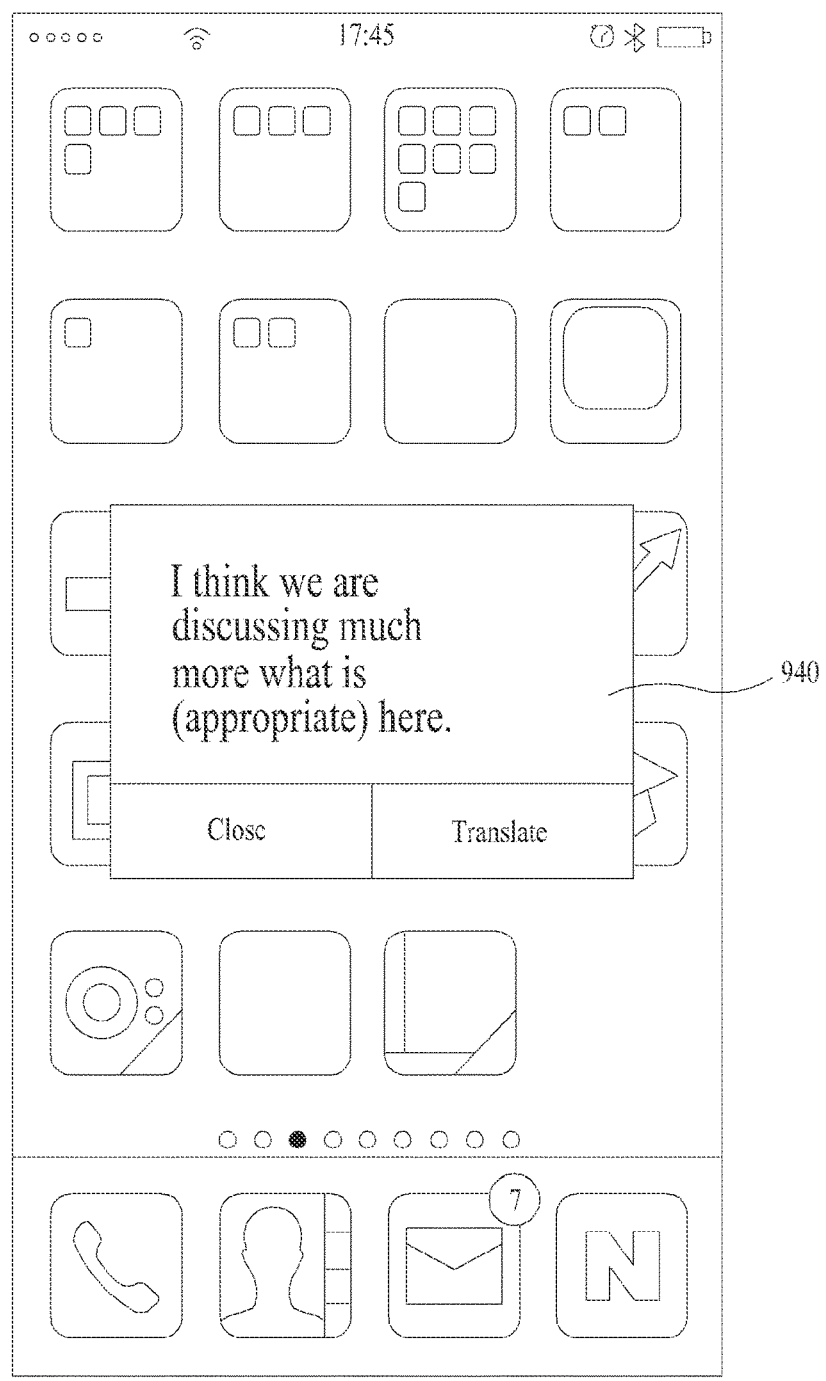

FIGS. 7 through 9 illustrate examples of a content type for wordbook learning according to some exemplary embodiments.

FIG. 7 illustrates an example of push notification content corresponding to a first type. Referring to FIG. 7, it is possible to help a user to memorize and learn a word based on spellings and meanings of the word by displaying spellings, phonetic symbols, and principal meanings of a target word to be learned on a notification window 720.

FIG. 8 illustrates an example of push notification content corresponding to a second type. Referring to FIG. 8, an example of a target word to be learned may be displayed on a notification window 830. Here, it is possible to provide a learning method of providing a target word to be learned as a blank within a sentence or phrase, without displaying the target word to be learned, so that a user may recall or directly input a corresponding word.

FIG. 9 illustrates an example of push notification content corresponding to a third type. Referring to FIG. 9, it is possible to induce a user to participate in translating an example by displaying an example of a target word to be learned and by providing a translation participation path of the example through a notification window 940.

Figure 10:
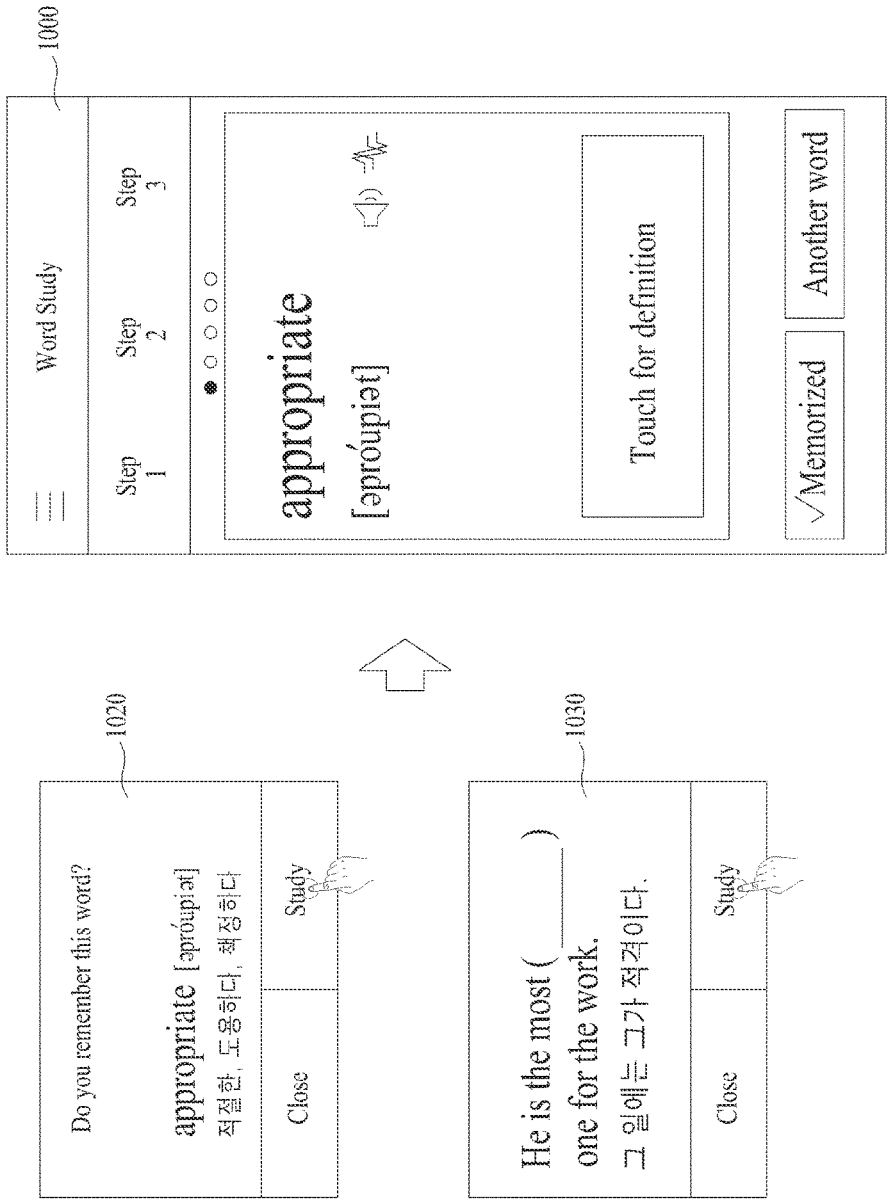
FIGS. 10 and 11 illustrate examples of a learning path through a push notification according to at least one exemplary embodiment.
Figure 11:
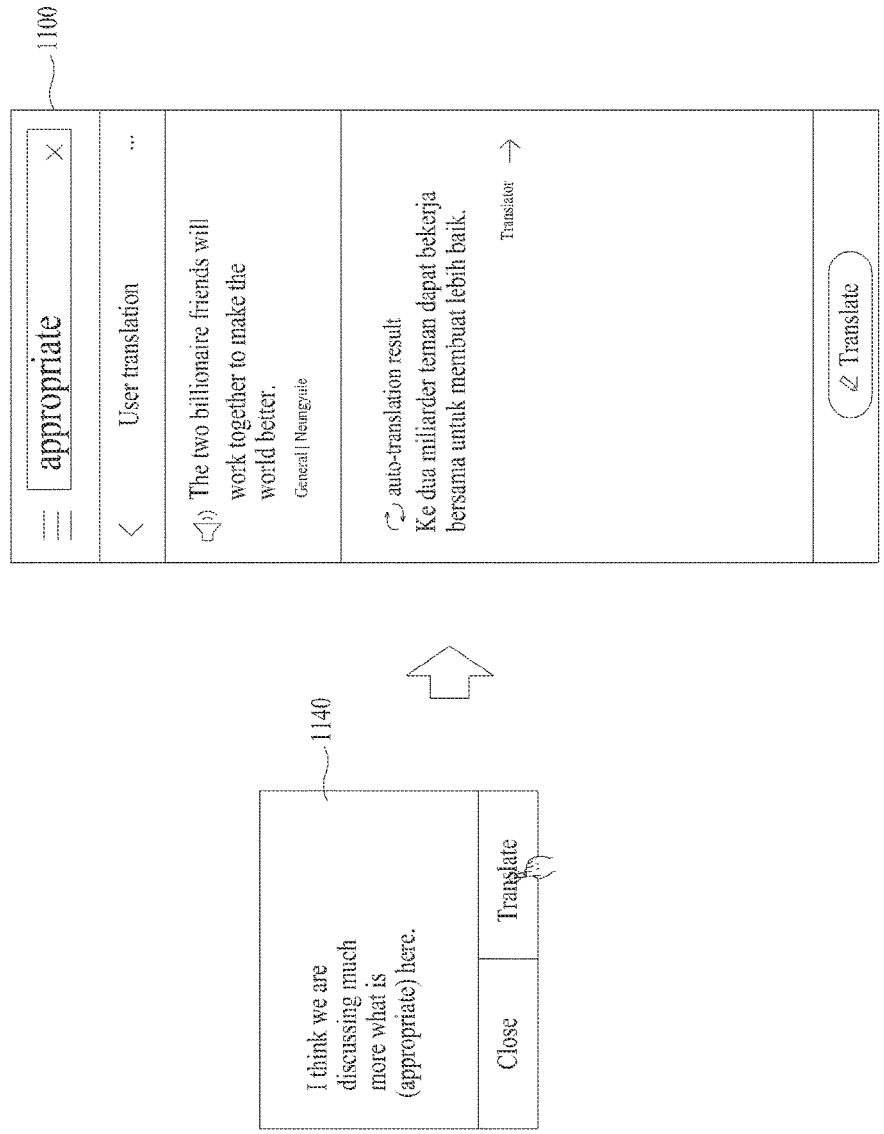

FIGS. 10 and 11 illustrate examples of a learning path through a push notification according to some exemplary embodiments.

Referring to FIG. 10, in response to a learning request from a user through a push notification window 1020 corresponding to a first type or a push notification window 1030 corresponding to a second type, words that still need to be memorized in a wordbook list may be sequentially displayed, and the user may opt to be directed to a study course page 1000 for help with a word memorization and learning. Here, a word corresponding to a learning target of the push notification window 1020 or 1030 may be displayed on the study course page 1000 as an initial target to be memorized.

Referring to FIG. 11, in response to a learning request from a user through a push notification window 1140 corresponding to a third type, a translation participation page 1100 that allows the user to participate in translating an example may be displayed and the user may opt to be directed to the translation participation page 1100. A word corresponding to a learning target of the push notification window 1140 is a word having an example and no translation and the translation participation page 1100 may be provided so that the user may directly translate the example of the word.

Figure 12:
FIGS. 12 and 13 illustrate examples of a path of providing an example of an individual word based on a network state according to at least one exemplary embodiment.
Figure 13:
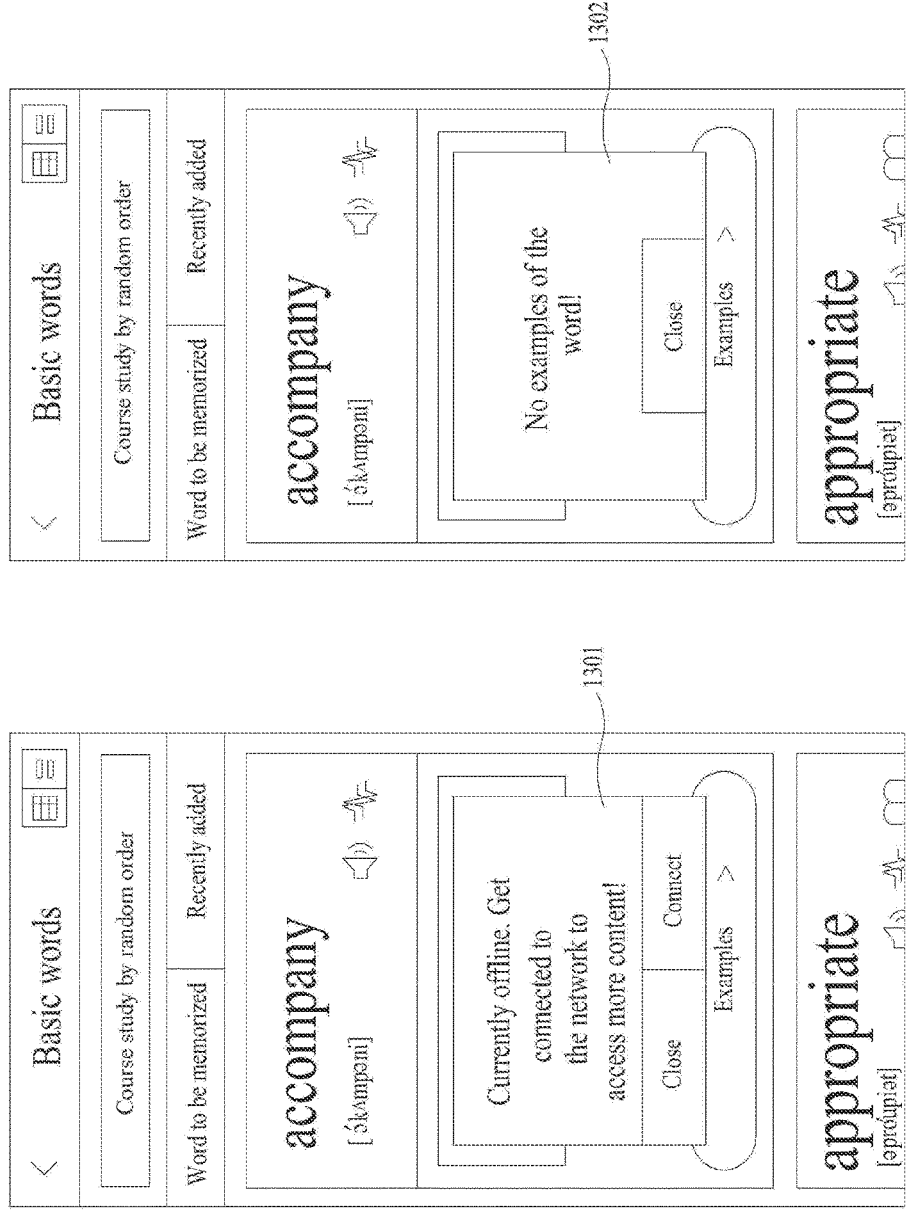

FIGS. 12 and 13 illustrate examples of a path of providing an example of an individual word based on a network state according to some exemplary embodiments.

Referring to FIG. 12, in a state in which a network connection of a user terminal is possible, in response to an input of a user on an example view button of an individual word card 1201 in a wordbook list, an example list page 1200 that shows the entire set of usage examples from the online dictionary may be displayed and the user may opt to be directed to the example list page. Referring to FIG. 13, in a state in which the network connection of the user terminal is impossible, a pop-up window 1301 for providing an offline notification and for guiding a network connection may be displayed in response to a user request for an example and accordingly, the user may be informed that the example cannot be provided and, at the same time, be induced to connect to the network. Also, if a word corresponding to the example requested by the user has no example, a pop-up window 1302 for informing that the word has no example, in detail, a related example of the word is absent may be displayed.

Accordingly, in a case in which the user is in an online state as a result of checking the network state when requesting an example of a word included in a wordbook list, the entire set of examples of the word from the online dictionary may be provided.

Figure 14:
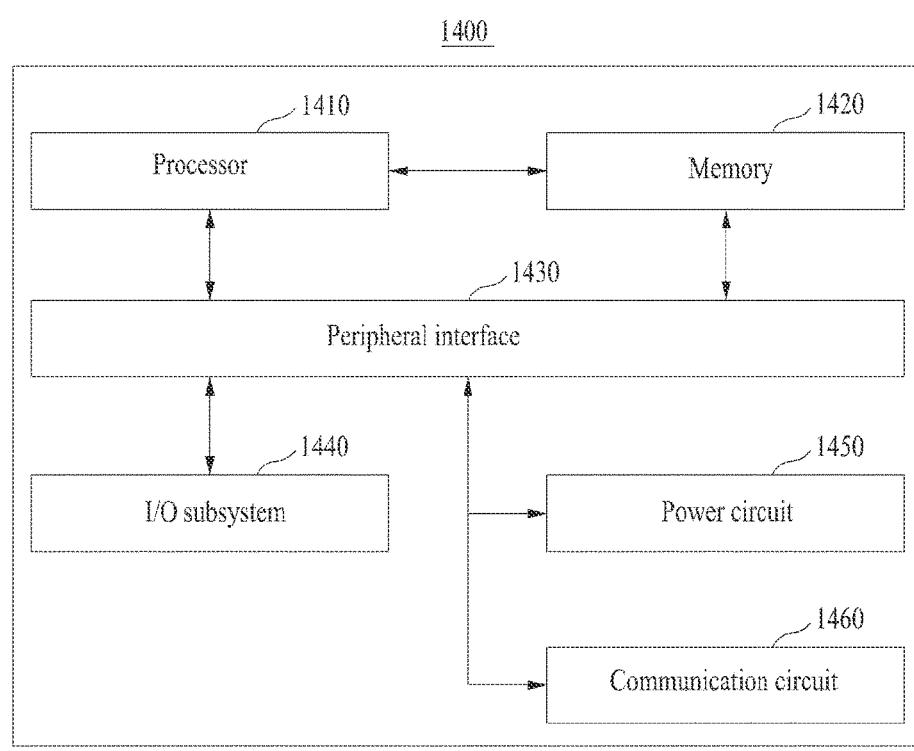
FIG. 14 is a block diagram illustrating an example of a configuration of a computer system according to at least one exemplary embodiment.

FIG. 14 is a block diagram illustrating an example of a configuration of a computer system 1400 according to some exemplary embodiments.

Referring to FIG. 14, the computer system 1400 may include at least one processor 1410, a memory 1420, a peripheral interface 1430, an input/output (I/O) subsystem 1440, a power circuit 1450, and a communication circuit 1460. Here, the computer system 1400 may correspond to a user terminal.

The memory 1420 may include, for example, a high-speed random access memory (HSRAM), a magnetic disk, a static random access memory (SRAM), a dynamic RAM (DRAM), read only memory (ROM), a flash memory, a non-volatile memory, etc. The memory 1420 may include a software module, a computer readable instruction set, and/or a variety of data required for an operation of the computer system 1400. Here, an access from another component such as the processor 1410 and the peripheral interface 1430 to the memory 1420 may be controlled by the processor 1410.

The peripheral interface 1430 may couple an input device and/or output device of the computer system 1400 with the processor 1410 and the memory 1420. The processor 1410 may perform a variety of functions for the computer system 1400 and process data by executing the software module or the instruction set stored in the memory 1420.

The I/O subsystem 1440 may couple various I/O peripheral devices with the peripheral interface 1430. For example, the I/O subsystem 1440 may include a controller for coupling the peripheral interface 1430 and a peripheral device such as a monitor, a keyboard, a mouse, a printer, and a touch screen or a sensor depending on a necessity. The I/O peripheral devices may be coupled with the peripheral interface 1430 without using the I/O subsystem 1440.

The power circuit 1450 may supply power to all of or a portion of components of a terminal. For example, the power circuit 1450 may include a power management system, at least one power source such as a battery and alternating circuit (AC), a charge system, a power failure detection circuit, a power converter or inverter, a power status indicator, or other components for creating, managing and distributing power.

The communication circuit 1460 enables communication with another computer system using at least one external port. Additionally, as described above, the communication circuit 1460 may enable communication with another computer system by including a radio frequency (RF) circuit and thereby transmitting and receiving an RF signal known as an electromagnetic signal.

The exemplary embodiments of FIG. 14 are only examples of the computer system 1400. The computer system 1400 may have a configuration or an arrangement for omitting a portion of the components illustrated in FIG. 14, further including components not illustrated in FIG. 14, or coupling two or more components. For example, a computer system for a communication terminal of a mobile environment may further include a touch screen, a sensor, and the like, in addition to the components of FIG. 14. A circuit for RF communication using a variety of communication methods, for example, wireless fidelity (Wi-Fi), 3rd generation (3G), long term evolution (LTE), Bluetooth, near field communication (NFC), and ZigBee, may be included in the communication circuit 1460. Components that may be included in the computer system 1400 may be configured as hardware that includes an integrated circuit specified for at least one signal processing or application, for example, ASIC, software, or a combination of hardware and software.

The content providing method may include a reduced number of operations or additional operations based on descriptions made above with reference to FIGS. 1 through 13. Also, two or more operations may be combined and the order or the positions of the operations may be modified.

The methods according to the exemplary embodiments may be configured in a program instruction form executable through various computer systems and thereby recorded in non-transitory computer readable media.

A program according to the exemplary embodiments may be configured as a PC-based program or an application exclusive for a mobile terminal. Also, the methods according to the exemplary embodiments may be performed by controlling, by the wordbook app, a user terminal. Such an application may be installed in the user terminal through a file provided from a file distribution system. As an example, the file distribution system may include a file transmitter (not shown) to transmit the file in response to a request from the user terminal.

As described above, according to some exemplary embodiments, since a push notification for wordbook learning is provided, a user may directly verify learning content and perform learning through a push notification without connecting to a wordbook. Accordingly, it is possible to enhance a user convenience and a learning efficiency. In particular, according to some exemplary embodiments, it is possible to provide further various and high-dimensional learning environments by differentially providing learning content based on dictionary information downloaded to a terminal or an offline state or an online state of a network.

The exemplary embodiments as disclosed herein may comprise program code including program instructions, software components, software modules, data files, data structures, and/or the like that are implemented by one or more physical hardware devices. Examples of program code include both machine code produced by a compiler and higher level program code that is executed using an interpreter. The hardware devices may include one or more processors. The one or more processors are computer processing devices configured to carry out the program code by performing arithmetical, logical, and input/output operations. Once the program code is loaded into the one or more processors, the one or more processors may be programmed to perform the program code, thereby transforming the one or more processors into special purpose processor(s).

Alternatively, or in addition to the processors discussed above, the hardware devices may include one or more Central Processing Units (CPUs), digital signal processors (DSPs), application-specific-integrated-circuits (ASICs), SoCs, field programmable gate arrays (FPGAs), or the like. In at least some cases, the one or more CPUs, SoCs, DSPs, ASICs and FPGAs, may generally be referred to as processing circuits and/or microprocessors.

The hardware devices may also include one or more storage devices. The one or more storage devices may be tangible or non-transitory computer readable storage media, such as random access memory (RAM), read only memory (ROM), a permanent mass storage device (such as a disk drive), and/or any other like data storage mechanism capable of storing and recording data. The one or more storage devices may be configured to store program code for one or more operating systems and/or the program code for implementing the exemplary embodiments described herein. The program code may also be loaded from a separate computer readable storage medium into the one or more storage devices and/or the one or more processors using a drive mechanism. Such separate computer readable storage medium may include a USB flash drive, memory stick, Blu-ray/DVD/CD-ROM drive, memory card, and/or other like computer readable storage medium (not shown). The program code may be loaded into the one or more storage devices and/or the one or more processors from a remote data storage device via a network interface, rather than via a computer readable storage medium. Additionally, the program code may be loaded into the one or more storage devices and/or the one or more processors from a remote computing system that is configured to transfer and/or distribute the program code over a network. The remote computing system may transfer and/or distribute the program code via a wired interface, an air interface, and/or any other like tangible or intangible medium. The one or more processors, the one or more storage devices, and/or the program code may be specially designed and constructed for the purposes of the exemplary embodiments, or they may be known devices that are altered and/or modified for the purposes of the exemplary embodiments.

It will be apparent to those skilled in the art that various modifications and variations can be made in the exemplary embodiments without departing from the spirit or scope of the invention. Thus, it is intended that the exemplary embodiments cover the modifications and variations of this invention provided they come within the scope of the appended claims and their equivalents.

What is claimed is:

1. A content providing method executed on at least one computer connectable over a computer network to a cloud-based wordbook service, the method comprising:
    selecting a target word to be learned from a wordbook list;
    determining a content type of the target word based on whether the at least one computer is connected to the cloud-based wordbook service; and
    providing content associated with the target word using a push notification of the content type;
    wherein determining of the content type comprises:
    (a) in an offline state wherein the at least one computer is not connected to the cloud-based wordbook service, determining the content type based on a presence of an example of the target word and a translation of the example and whether the example and the translation have been downloaded to the computer; and
    (b) in an online state wherein the at least one computer is connected to the cloud-based wordbook service, determining the content type based on the presence of the example and the translation, regardless of whether the example and the translation have been downloaded to the computer;
    wherein, in the offline state, determining the content type comprises determining a word having the example and the translation in which the example and the translation have been downloaded to the computer, among target words to be learned, as a first type that provides a headword and a meaning of the word or a second type that provides the example and the translation;
    wherein the first type and the second type are determined based on a preset ratio.

2. The method of claim 1, wherein the selecting of the target word comprises selecting the target word from the wordbook list based on a word selection rule by applying, as the word selection rule, at least one of the following steps:
    selecting a word having an example,
    selecting a word to be memorized,
    selecting based on wordbook registration order,
    selecting based on a number of words used for the example of the word, and selecting based on a difficulty level.

3. The method of claim 1, wherein the selecting of the target word comprises updating the target word in response to a presence of matters to be modified in the wordbook list or at desired intervals.

4. The method of claim 1, wherein determining of the content type comprises:
    (a) in the offline state wherein the at least one computer is not connected to the cloud-based wordbook service, determining the content type based on a presence of the content and whether the content has been downloaded to the computer; and
    (b) in the online state wherein the at least one computer is connected to the cloud-based wordbook service, determining the content type based on the presence of the content regardless of whether the content has been downloaded to the computer.

5. The method of claim 1 wherein, in the offline state, determining the content type further comprises excluding, from the target words, a word having no example, a word having an example and no translation, and a word having an example and a translation in which the example and the translation are not downloaded to the computer.

6. The method of claim 1, wherein, in the offline state, determining the content type comprises:
   determining a word having an example and a translation in which the example and the translation are not downloaded to the computer, among the target words, as the first type that provides the headword and the meaning of the word; and
   determining the word having the example and the translation and of which the example and the translation have been downloaded to the computer, among the target words, as the second type that provides the example and the translation.

7. The method of claim 1, wherein, in the online state, determining the content type comprises:
   determining a word having the example and the translation among target words as the first type that provides the headword and the meaning of the word or the second type that provides the example and the translation; and
   determining a word having an example and no translation among the target words as a third type that provides an opportunity to participate in translating the example.

8. The method of claim 7, wherein, in the online state, determining the content type further comprises excluding a word having no example from the target words.

9. The method of claim 1, wherein the second type processes the target word included in the example to be blank.

10. The method of claim 1, wherein the content type is classified into the first type that provides the headword and the meaning of the target word, the second type that provides the example of the target word and the translation of the example, and a third type that provides an opportunity to participate in translating the example of the target word, and
   the providing of the content comprises providing an option to be directed to a study course for learning each individual word of the wordbook list through a push notification of the first type and the second type, and providing an option to be directed to a translation participation page for participating in translating the example through a push notification of the third type.

11. A non-transitory computer readable recording medium storing computer readable instructions to control a computer system connectable over a computer network to a cloud-based wordbook service to provide content to be learned, wherein the computer readable instructions control the computer system by a method comprising:
   selecting a target word to be learned from a wordbook list;
   determining a content type of the target word based on whether the at least one computer is connected to the cloud-based wordbook service; and
   providing content associated with the target word using a push notification of the content type,
   wherein determining of the content type comprises:
   (a) in an offline state wherein the at least one computer is not connected to the cloud-based wordbook service, determining the content type based on a presence of an example of the target word and a translation of the example and whether the example and the translation have been downloaded to the computer; and
   (b) in an online state wherein the at least one computer is connected to the cloud-based wordbook service, determining the content type based on the presence of the example and the translation, regardless of whether the example and the translation have been downloaded to the computer;
   wherein, in the offline state, determining the content type comprises determining a word having the example and the translation in which the example and the translation have been downloaded to the computer among target words to be learned, as a first type that provides a headword and a meaning of the word or a second type that provides the example and the translation;
   wherein the first type and the second type are determined based on a preset ratio.

12. A content providing system provided on at least one computer comprising:
   a database;
   a network interface for connecting the at least one computer to a cloud-based wordbook service;
   a processor;
   a selector configured to cause the processor to select a target word to be learned from a wordbook list;
   a determiner configured to cause the processor to determine a content type of the target word based on whether the at least one computer is connected to the cloud-based wordbook service; and
   a provider configured to cause the processor to provide content associated with the target word using a push notification of the content type,
   wherein the determiner is further configured to cause the processor to:
   (a) in an offline state wherein the at least one computer is not connected to the cloud-based wordbook service, determine the content type based on a presence of an example of the target word and a translation of the example and whether the example and the translation have been downloaded to the computer; and
   (b) in an online state wherein the at least one computer is connected to the cloud-based wordbook service, determine the content type based on the presence of the example and the translation, regardless of whether the example and the translation have been downloaded to the computer;
   wherein, in the offline state, the determiner is further configured to cause the processor to determine a word having the example and the translation in which the example and the translation have been downloaded to the computer, among target words to be learned as a first type that provides a headword and a meaning of the word or a second type that provides the example and the translation;
   wherein the first type and the second type are determined based on a preset ratio.

13. The content providing system of claim 12, wherein the selector is configured to cause the processor to select the target word from the wordbook list based on a word selection rule by applying, as the word selection rule, at least one of the following:
   selecting a word having an example,
   selecting a word to be memorized,
   selecting based on wordbook registration order,
   selecting based on a number of words used for the example of the word, and
   selecting based on a difficulty level.

14. The content providing system of claim 12, wherein, in the offline state, the determiner is further configured to cause the processor to exclude, from the target words, a word having no example, a word having an example and no translation, and a word having an example and a translation in which the example and the translation have not been downloaded to the at least one computer.

15. The content providing system of claim 12, wherein, in the online state, the determiner is further configured to cause the processor to determine a word having the example and the translation, among target words to be learned, as the first type that provides the headword and the meaning of the word or the second type that provides the example and the translation, to determine a word having an example and no translation among the target words as a third type that provides an opportunity to participate in translating the example, and to exclude a word having no example from the target words.

16. The content providing system of claim 12, wherein the content type is classified into the first type that provides the headword and the meaning of the target word, the second type that provides the example of the target word and the translation of the example, and a third type that provides an opportunity to participate in translating the example of the target word, and the provider is further configured to cause the processor to provide an option to be directed to a study course for learning each individual word of the wordbook list through a push notification of the first type and the second type, and to provide an option to be directed to a translation participation page for participating in translating the example through a push notification of the third type.

\* \* \* \* \*